Oct. 27, 1936.  J. S. KEEN  2,058,890

POWER REVERSE VALVE CONTROL

Filed May 18, 1932  2 Sheets-Sheet 1

INVENTOR
JOHN S. KEEN
BY
ATTORNEY

Oct. 27, 1936. J. S. KEEN 2,058,890
POWER REVERSE VALVE CONTROL
Filed May 18, 1932 2 Sheets-Sheet 2
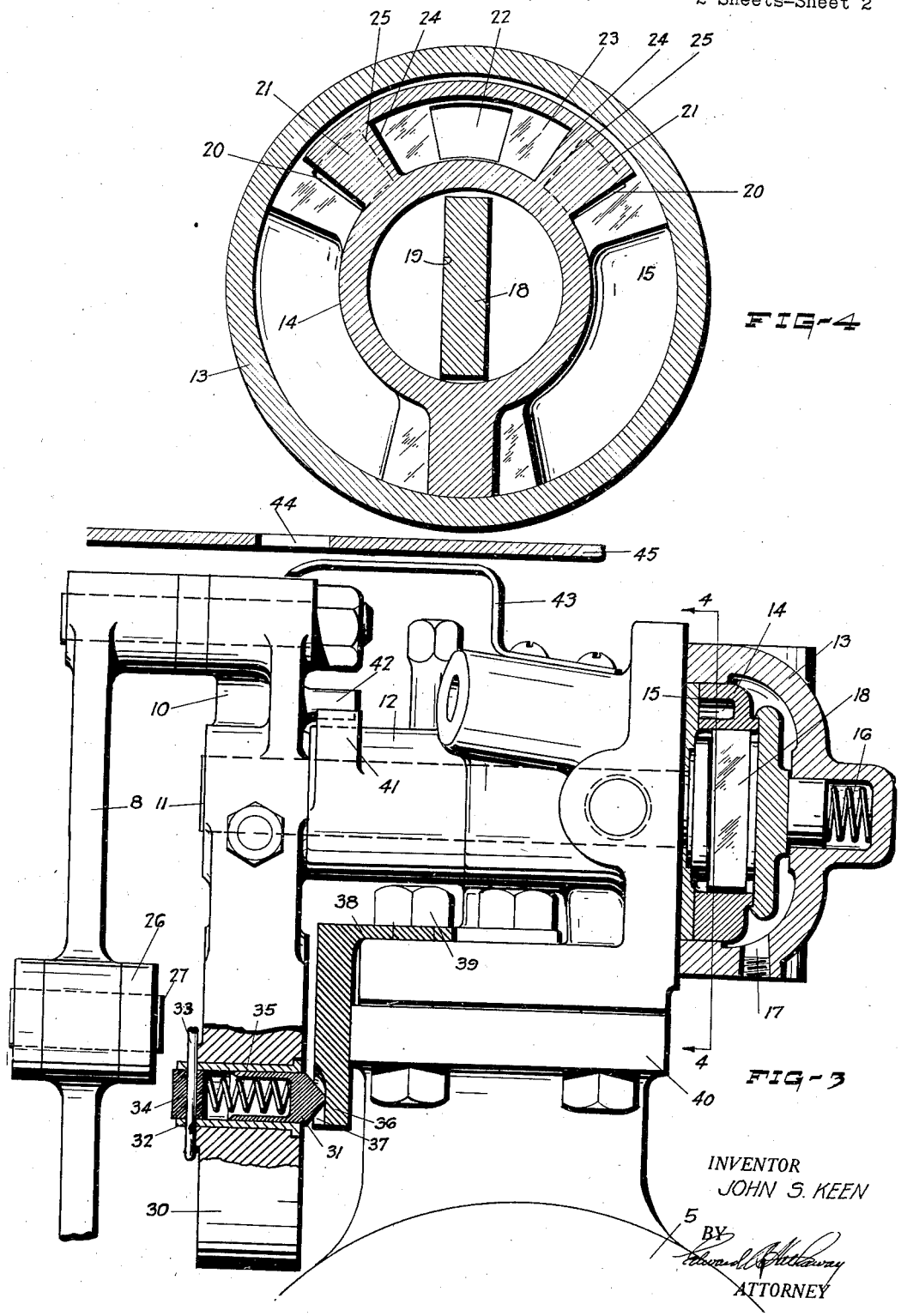
INVENTOR
JOHN S. KEEN
BY
ATTORNEY Patented Oct. 27, 1936

2,058,890

UNITED STATES PATENT OFFICE 2,058,890

POWER REVERSE VALVE CONTROL

John S. Keen, Philadelphia, Pa.

Application May 18, 1932, Serial No. 611,977

10 Claims. (Cl. 121—41)

This invention relates generally to power reverse gears for locomotives and more particularly to an improved valve control arrangement for the power reverse gear.

There are various general types of power reverse gears for locomotives certain of which employ power actuated screws whereby a positive mechanical actuation and control of the reverse gear may be obtained without danger of shifting or creeping of the valve gear from a desired set position. The ability to positively maintain any adjusted position of the reverse gear is most desirable because of its employment for controlling cut-off of the engine valve, which operation is in addition to the function of reversing the valve gear. Other types of power reverse gears employ a fluid pressure actuated piston and cylinder motor connected through suitable linkages to the reverse gear mechanism. This type of control has the advantage of simplicity and lower cost over the screw type, although difficulty is often experienced in obtaining the advantages of the screw type in positively holding the valve gear in any desired cut-off position.

The inability of certain prior gears of the non-screw type to hold the valve gear in fixed position has heretofore resulted in the proposal of various arrangements for overcoming what was believed to be the contributing causes. One type of power reverse gear such as is illustrated herein relies for stability of operation in having the distributing valve of the piston and cylinder motor maintained in a neutral position so that fluid pressure such as air may be equally supplied to each side of the piston to hold the same against movement while movement of the piston is effected by supplying more air pressure to one side thereof and exhausting air from the other side or vice versa. It is thus seen that the slightest degree of valve displacement from neutral would result in an unbalanced supply of actuating fluid to the reverse gear piston, consequently tending to cause movement of the power gear from the desired position. Due to the desirability of maintaining the valve at neutral with a relatively high degree of precision which is something desired in practice but often only theoretically possible, it is readily understood that all contributing factors tending toward unbalance of the valve must be carefully compensated for to overcome the same and yet allow free and unrestricted operation of the power reverse gear by the engineer.

In the particular type of valve gear herein shown and in which it is sought to overcome unstable operation, the distributing valve of the power reverse motor is of the oscillating type actuated from the cab and controlled through suitable linkages including a floating lever, although it will of course be understood that other types of valves might be employed, in connection with which my improvements would be equally applicable.

One object of my invention is to provide improved means for obtaining the advantages of positive control of the screw type of power reverse gear, without the disadvantages thereof, together with the simplicity in construction and speed of operation of the straight piston actuated link type of gear. More specifically a further object is to provide improved means for insuring that the distributing valve will not only be restored to but maintained in neutral position after any adjustment while another object in this respect is to provide an improved weight controlled mechanism for assisting in maintaining the distributing valve in neutral, this mechanism being arranged to permit the usual flexible operation of the general type of power reverse gear shown herein. In one specific aspect of the invention I accomplish the foregoing objects by providing a substantial weight disposed diametrically opposite to certain portions of the distributing valve linkages so as to tend to reduce the unbalancing effect of such linkages and help restore the valve to neutral, while an improved latch arrangement is provided whereby when the distributing valve is restored to or nearly to its neutral position by the usual follow-up mechanism the latch will then become operative to maintain the distributing valve in neutral without any appreciable variation therefrom, although the latch mechanism will automatically release without any substantial restraint when the engineer operates the power reverse.

Other objects and advantages of my improved control will be more apparent to those skilled in the art from the following description of the accompanying drawings in which.

Figure 1:
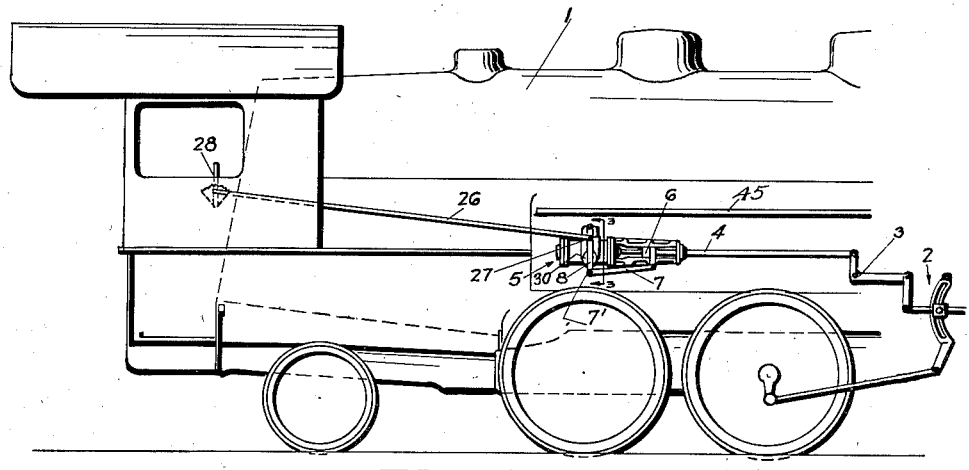
Fig. 1 is a side elevation of the rear portion of the locomotive showing generally the power reverse gear.
Figure 2:
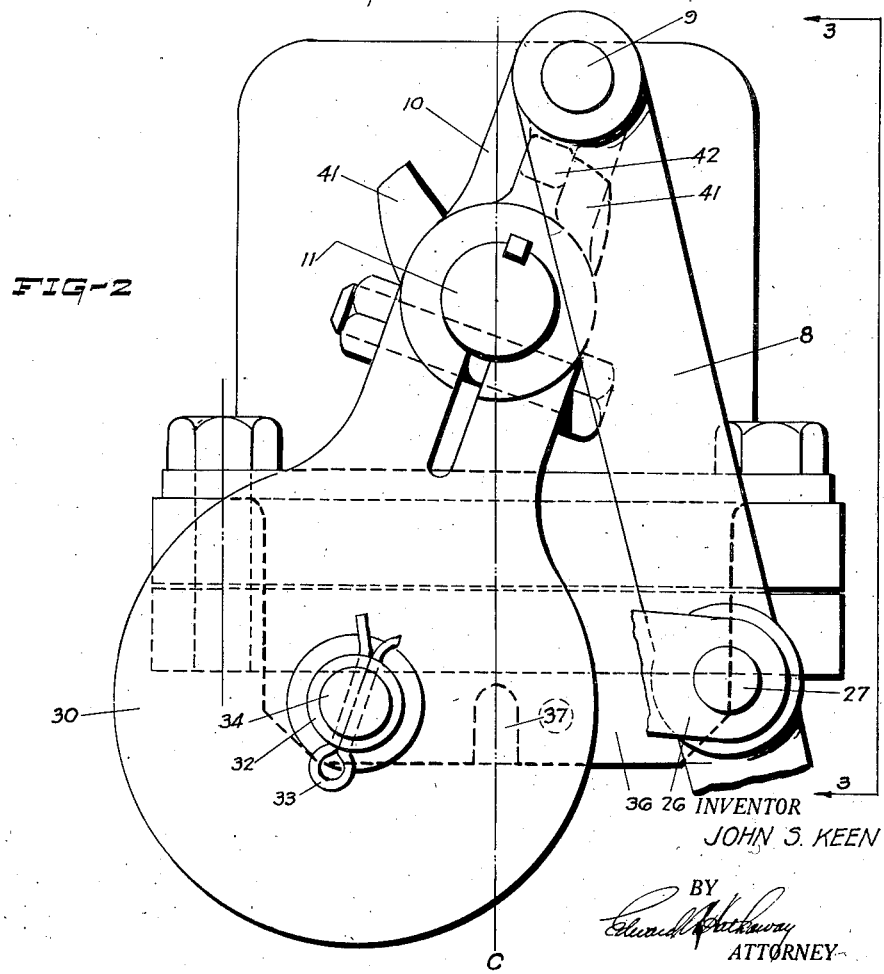
Fig. 2 is an enlarged side elevation of the power reverse gear distributing valve mechanism with my improved neutralizing and balancing arrangement therefor.

Fig. 3 is an end elevation of the mechanism shown in Fig. 2, looking in a direction as indicated by the line 3—3 of Figs. 1 and 2 with parts broken away to show details of construction; and Fig. 4 is a transverse section of the distributing valve taken substantially on the line 4—4 of Fig. 3, but with the valve in neutral position.

In illustrating one embodiment of the invention, which is one of several forms the invention may take, I have shown a locomotive 1 having an engine valve gear partially diagrammatically indicated at 2 combined with usual reversing and cut-off control linkages. As these mechanisms are well known in the art and are of various types, it is not deemed necessary to describe the same in detail except to point out generally that the actuating means therefor includes preferably a bellcrank 3 connected by a reach rod 4 to a piston of a piston and cylinder power reverse motor generally indicated at 5. The motor as shown is provided with a suitable crosshead 6 to which one end of a link 7 is pivotally connected while the other end thereof is pivotally connected as at 7' to the lower end of a floating lever 8. The upper end of the floating lever is pivotally connected as by a pin 9 to a valve arm 10. This arm is secured to a valve shaft 11 which extends through a suitable housing 12 and into a valve chest generally indicated at 13.

While various types of valves may be employed the one shown herein, for purposes of illustration, includes an oscillatable valve member 14 held to its valve seat 15 by a spring 16 together with air pressure or other suitable fluid pressure supplied to the valve chest through an inlet 17. The valve shaft 11 has a rectangular lug 18 disposed in a correspondingly shaped slot 19 of the valve element to rotate the same. This distributing valve per se does not constitute a part of the invention and hence does not need to be described in detail except to point out that with the valve element in neutral position fluid pressure is equally supplied to both sides of the piston of power reverse motor 5 due to the provision of an equal amount of negative lap 20 for the two inlets 21 communicating through suitable ports and passages with the opposite ends of the power cylinder. A common exhaust port 22 is in constant communication with a suitable recess 23 formed in the valve element 14. When the valve element is rotated so as to close the negative lap 20 of one or the other of the ports 21 the exhaust port will be placed in communication with the other of inlet ports 21 due to edge 24 of the exhaust chamber 23 overriding the inner edge 25 of port 21. Simultaneously the other port 21 is opened wider to permit a greater supply of actuating fluid to the other side of the power piston thus moving the power reverse gear to any desired position.

To actuate initially the valve from its neutral position as above mentioned there may be employed any suitable adjustable means adapted to be releasably held in different positions away from a neutral position thereby to effect any desired degree of cut-off or reversing position. A usual form of such adjustable means comprises a rod 26 pivotally connected as at 27 to floating lever 7 and to the reverse lever 28 located in the cab. This lever may be provided with any usual quadrant and latch mechanism to hold a set adjustment thereof.

When the distributing valve 14 is in its neutral position shown in Fig. 4, valve arm 10 is in a vertical position in alignment with floating lever 8 as shown in Fig. 1, but without my improved arrangement difficulties are encountered in maintaining such a precise position due not only to the causes previously mentioned but also possibly due to the vibration of the locomotive while travelling. To overcome these difficulties in a manner believed most effective, I have provided means supplementary to the follow-up mechanism, this means including a weighted lever or arm 30 located diametrically opposite to and preferably formed as an integral continuation of valve arm 10 while there is also provided a spring pressed latch plunger 31 carried preferably in the center of the weight of lever 30 although any other location of the latch could be used either with or without the weight as may be determined in accordance with particular conditions.

Plunger 31 is slidably disposed within a bushing 32 provided with a flange at one end while its other end extends slightly beyond the surface of lever 30 to receive a cotter pin 33 which not only holds bushing 32 in position but also holds a suitable plug 34 against which rests a spring 35 for yieldingly pressing plunger 31 against a latch plate 36. When the distributing valve is in neutral position plunger 31 will engage a small notch 37 formed in a removable wear plate of latch plate 36. The neutral groove 37 as shown in Fig. 2 is of narrow extent and its contour may be such as to permit relatively free movement of plunger 31 from this groove during adjustment.

Latch plate 36 is in the form of an elongated angle member having a short leg 38 secured to the distributing valve casing as by bolts 39, it being understood that the distributing valve mechanism is bolted to a flange 40 formed on the top side of the power cylinder 5 and through which suitable fluid distributing passages are formed. These passages and the specific internal mechanism of the cylinder need not be described as such are well known.

In operation if it is desired either to reverse the valve gear or to vary the cut-off, reverse lever 28 is shifted either forwardly or backwardly from neutral to the desired adjusted position, thus causing link 26 to initially move floating lever 8 about its lower pivot 7' as a fulcrum. Assuming that reverse lever 28 is moved forwardly, then floating lever 8 will be moved forwardly about its lower pivot thus causing pivot 9 to move forwardly to the position shown in Fig. 2 whereby distributing valve 14 is rotated to exhaust fluid from the right end of power cylinder 5 and admit more fluid to the left end thereof. Power motor 5 will now start moving toward the right, carrying with it connecting link 7 which in turn will now swing floating lever 8 about pivot 27 as a fulcrum, this pivot remaining fixed due to reverse lever 28 being held in its newly adjusted position. As floating lever 8 now swings around pivot 27 during right hand movement of motor 5, pivot 9 will swing in a left direction Fig. 2 toward its neutral position and upon reaching this position latch plunger 31 will fall into groove 37, thereby releasably holding the distributing valve in its desired neutral position as shown in Fig. 4. However whenever valve arm 10 is displaced from its neutral or dead center vertical position C, Fig. 2, the weight of this arm, together with the weight of floating lever 8 when displaced from the axis of valve shaft 11, constitutes an unbalancing factor tending to abnormally bias the distributing valve 14 away from its neutral position so that it does not respond as freely and readily in returning to neutral as it will in my improved arrangement wherein the centralizing weight 30 will, depending upon the various circumstances, partially or wholly counterbalance the unbalancing forces of floating lever 8 and valve arm 10. Also, even with the valve in neutral position, floating lever 8 will in most adjustments be offset from the valve axis thus constantly creating a source of some degree of unbalance on the valve. The weight 30, however, will resist this to at least a certain degree while latch pin 31 will insure complete stability. If the reverse lever 28 is moved rearwardly so as to swing floating lever 8 to the left side of valve shaft 11, Fig. 2, thereby causing power motor 5 to move toward the left, the restoring or follow-up action of floating lever 8 through link 7 will involve the same steps as just described except in the opposite direction.

As is usual in distributing valves of the type disclosed a pair of stop lugs 41 may be provided on the shaft housing 12 while a lug 42 projecting inwardly from valve arm 10 is adapted to engage one or the other of stop lugs 41 to limit the amount of rotation of distributing valve 14 and also avoid damaging any parts due to excessive movement at one time of reverse lever 28. However if lug 42 is moved over into engagement with one or the other of stop lugs 41 subsequent restoring or follow-up action on the floating lever 8 will cause stop lug 42 to move away from stop lugs 41 whereupon reverse lever 28 may be further adjusted if such is necessary.

To facilitate proper adjusting and checking of the distributing valve and actuating links and arms such as 10, etc. I provide a suitable neutral mark on top of arm 10 which should be in alignment with pointer 43 supported on the valve casing, when valve 14 is in neutral position. To assist in observing whether the valve is in neutral while the locomotive is travelling I provide an observation opening 44 in a running board 45 disposed alongside of the boiler.

From the foregoing it is seen that my improved arrangement will lend a high degree of stability to the general type of reverse gear shown herein and will insure maintaining the distributing valve in substantially its precise neutral position thus avoiding gradual shifting or creeping of the power reverse gear, which action if allowed is liable to result in damage to some part of the locomotive valve gear. It will be noted that my arrangement not only has the advantage of positively neutralizing the valve and maintaining it in neutral position but accomplishes this in a relatively simple and economical manner, the arrangement being such that it may be easily and inexpensively applied to power reverse gears already installed without any change in the construction thereof.

It will of course be understood by those skilled in the art that various changes and rearrangements of parts may be made without departing from the spirit of the invention as set forth in the appended claims.

I claim:

1. A locomotive power reverse gear comprising, in combination, a fluid actuated piston and cylinder motor, a distributing valve therefor having a valve seat immovably held in one position relative to said cylinder throughout all operations and a cooperating movable valve element having a single neutral position with respect to said seat and being normally maintained in said neutral position when said motor is stationary, adjustable means adapted to be adjusted to different positions for moving and initially displacing said valve element from its neutral position to effect operation of the power reverse gear, follow-up mechanism for returning the valve element toward its neutral position irrespective of the extent of displacement of the valve from neutral, and means supplementary to said follow-up mechanism for assisting in returning the valve element to neutral while said adjustable means is held in an adjusted position, said supplementary means including releasable mechanical holding means rendered inoperative when said valve is substantially displaced from neutral but rendered operative to return the valve to neutral only after the valve is substantially returned thereto and for substantially positively maintaining the same in neutral.

2. A locomotive power reverse gear comprising, in combination, a fluid actuated piston and cylinder motor, a distributing valve therefor having a valve seat immovably held in one position relative to said cylinder throughout all operations and a cooperating movable valve element having a single neutral position with respect to said seat and being normally maintained in said neutral position when said motor is stationary, adjustable means adapted to be adjusted to different positions for moving and initially displacing said valve element from its neutral position to effect operation of the power reverse gear, follow-up mechanism for returning the valve element toward its neutral position after being moved therefrom, and means for assisting in maintaining said valve element in neutral position while said adjustable means is held in an adjusted position, comprising a latch mechanism for releasably holding the valve element in neutral position, said latch mechanism and valve having provision whereby the latch is rendered inoperative when said valve is substantially displaced from neutral and is rendered operative only after the valve is substantially returned thereto.

3. A power reverse gear comprising, in combination, a fluid actuated piston and cylinder motor, a distributing valve therefor normally maintained in a neutral position when said motor is stationary, adjustable means adapted to be adjusted to different positions for moving said distributing valve from its neutral position to effect operation of the power reverse gear, follow-up mechanism for returning the distributing valve toward its neutral position, and a weighted counterbalancing lever tending to move the valve mechanism toward neutral position while said adjustable means is held in an adjusted position.

4. A power reverse gear comprising, in combination, a fluid actuated piston and cylinder motor, a distributing valve therefor normally maintained in a neutral position when said motor is stationary, adjustable means adapted to be adjusted to different positions for moving said distributing valve from its neutral position to effect operation of the power reverse gear, follow-up mechanism for returning the distributing valve toward its neutral position, means for assisting in maintaining said distributing valve in neutral position while said adjustable means is held in an adjusted position, said assisting means including a latch mechanism for releasably holding the distributing valve in neutral position, and a weighted counterbalancing lever tending to move the valve mechanism toward neutral position.

5. A power reverse gear comprising, in combination, a fluid actuated piston and cylinder motor, an oscillatable distributing valve therefor, a valve actuating arm, a floating lever operatively connected to said arm and the piston of said motor for effecting a follow-up action on said valve to restore it to neutral, said arm and lever imposing unbalancing gravity forces on said valve when the same is displaced from its neutral position, adjustable means for effecting initial movement of said valve from its neutral position, and a weighted lever associated with said valve and arranged so as to tend to balance the unbalancing forces of said arm and lever when said distributing valve is moved from neutral position and while said adjustable means is held in an adjusted position.

6. A locomotive power reverse gear comprising, in combination, a fluid actuated piston and cylinder motor, a distributing valve therefor having a valve seat immovably held in one position relative to said cylinder throughout all operations and a cooperating oscillatable valve element having only a single neutral position with respect to said seat and being maintained in said neutral position when said motor is stationary, a valve actuating arm for said valve element, a floating lever operatively connected to said arm and the piston of said motor for effecting a follow-up action, adjustable means for effecting initial movement of said valve from its neutral position, and means for releasably holding the valve in substantially neutral position when the valve is moved thereto by the follow-up mechanism and while said adjustable means is held in an adjusted position, said releasable means having provision for being rendered inoperative when said valve is displaced substantially from neutral and is rendered operative only after the valve is substantially returned thereto.

7. A power reverse gear comprising, in combination, a fluid actuated piston and cylinder motor, an oscillatable distributing valve therefor, a valve actuating arm, a floating lever operatively connected to said arm and the piston of said motor for effecting a follow-up action, a weighted lever substantially in alignment with said valve arm, adjustable means for effecting initial movement of said valve from its neutral position, said arm and weighted lever being disposed on substantially diametrically opposite sides of the valve axis and in a substantially vertical position when said distributing valve is in its neutral position, whereby irrespective of any adjusted position of said adjustable means the effectiveness of the weight is reduced as the valve approaches neutral position but increased in proportion to its movement from either side of said vertical position.

8. A power reverse gear comprising, in combination, a fluid actuated piston and cylinder motor, an oscillatable distributing valve therefor, a valve actuating arm, a floating lever operatively connected to said arm and the piston of said motor for effecting a follow-up action, a weighted lever substantially in alignment with said valve arm, adjustable means for effecting initial movement of said valve from its neutral position, said arm and weighted lever being disposed on substantially diametrically opposite sides of the valve axis and in a substantially vertical position when said distributing valve is in its neutral position, and means adapted to be rendered operative when the valve approaches its neutral position so as to hold the valve in neutral irrespective of the adjusted position of said adjustable means.

9. A power reverse gear comprising, in combination, a fluid actuated piston and cylinder motor, an oscillatable distributing valve therefor, a valve actuating arm, a floating lever operatively connected to said arm and the piston of said motor for effecting a follow-up action, a reversing lever connected to said floating lever and adapted to be held in different adjusted positions, a weighted lever substantially in alignment with said valve arm, said arm and weighted lever being disposed on substantially diametrically opposite sides of the valve axis and in a substantially vertical position when said distributing valve is in its neutral position, a releasable latch carried by said weight, and a latch plate having a notch to receive said latch when said valve is in its neutral position irrespective of the adjusted position of said reversing lever.

10. A locomotive power reverse gear comprising, in combination, a fluid actuated piston and cylinder motor, a distributing valve therefor having a valve seat immovably held in one position relative to said cylinder throughout all operations and a cooperating movable valve element having only a single neutral position with respect to said seat and being normally maintained in said neutral position when said motor is stationary, adjustable means adapted to be adjusted to different positions for moving and initially displacing said valve element from its neutral position to effect operation of the power reverse gear, follow-up mechanism for returning the distributing valve toward its neutral position after being moved therefrom irrespective of the extent of displacement of the valve from neutral, and means for mechanically holding the distributing valve in neutral position but adapted to be released automatically upon actuation of said adjustable means from any set position thereof, said holding means having provision whereby it is rendered inoperative when said valve is displaced substantially from neutral and is rendered operative only after the valve is substantially returned thereto.

JOHN S. KEEN.